United States Patent [19]

Setani

[11] Patent Number: 5,150,250
[45] Date of Patent: Sep. 22, 1992

[54] LIGHT SCANNING OPTICAL SYSTEM FOR AN IMAGE OUTPUT SCANNER USING AN ELECTRO-MECHANICAL LIGHT MODULATOR

[75] Inventor: Michitaka Setani, Kawasaki, Japan

[73] Assignee: Canon Kabushiki Kaisha, Tokyo, Japan

[21] Appl. No.: 766,268

[22] Filed: Sep. 27, 1991

Related U.S. Application Data

[63] Continuation of Ser. No. 508,476, Apr. 11, 1990, abandoned, which is a continuation of Ser. No. 344,449, Apr. 28, 1989, abandoned, which is a continuation of Ser. No. 820,748, Jan. 22, 1986, abandoned.

[30] Foreign Application Priority Data

Jan. 23, 1985 [JP] Japan .................. 61-009155
Jan. 23, 1985 [JP] Japan .................. 61-009156

[51] Int. Cl.$^5$ ............................ G02B 26/10
[52] U.S. Cl. .................. 359/221; 359/201; 359/213; 359/223; 346/160
[58] Field of Search ............ 359/196, 212, 201, 208, 359/209, 217, 218, 221, 223, 213, 291; 346/160; 358/233, 484; 353/122

[56] References Cited

U.S. PATENT DOCUMENTS

| | | |
|---|---|---|
| 3,746,911 | 7/1973 | Nathanson et al. |
| 3,886,310 | 5/1975 | Guldberg et al. |
| 4,199,219 | 4/1980 | Suzuki et al. .......... 359/209 |
| 4,397,521 | 8/1983 | Antos et al. .......... 359/217 |
| 4,447,112 | 5/1989 | Matsuoka et al. .......... 359/218 |
| 4,454,547 | 6/1984 | Yip et al. .......... 358/484 |
| 4,512,625 | 4/1985 | Brueggeman .......... 359/208 |
| 4,523,801 | 6/1985 | Baba et al. .......... 359/218 |
| 4,571,603 | 2/1986 | Hornbeck et al. .......... 346/160 |
| 4,592,628 | 6/1986 | Altman et al. .......... 359/223 |
| 4,596,992 | 6/1986 | Hornbeck .......... 340/160 |
| 4,728,185 | 3/1988 | Thomas .......... 353/122 |
| 4,755,013 | 7/1988 | Setani .......... 359/291 |
| 4,775,204 | 10/1988 | Setani .......... 359/201 |
| 4,842,396 | 6/1989 | Minoura et al. .......... 359/212 |

FOREIGN PATENT DOCUMENTS

0040302 11/1981 European Pat. Off.
1441840 7/1976 United Kingdom.
2123247 1/1984 United Kingdom.

OTHER PUBLICATIONS

"Dynamic Micromechanics on Silicon: Techniques And Devices," Kurt E. Petersen, IEEE Transactions on Electron Devices, vol. ED-25, No. 10, Oct., 1978.

*Primary Examiner*—Loha Ben
*Attorney, Agent, or Firm*—Fitzpatrick, Cella, Harper & Scinto

[57] ABSTRACT

A light scanning optical system of an image output scanner in which a light beam incident from a light source through an irradiating optical system is applied to an electro-mechanical light modulator comprising a number of elements capable of deflecting the incident light beam in at least two directions in conformity with an input signal and arranged in the main scan direction, and image information is prepared by the change-over of the direction of deflection of each of the elements, whereafter only a signal light is projected onto a photosensitive member by a projection optical system is characterized in that the shape of at least one of the irradiating and projection optical system is flat in the main scan direction and the electro-mechanical light modulator is irradiated in the form of a slit.

18 Claims, 4 Drawing Sheets

LIGHT SCANNING OPTICAL SYSTEM FOR AN IMAGE OUTPUT SCANNER USING AN ELECTRO-MECHANICAL LIGHT MODULATOR

This application is a continuation of application Ser. No. 07/508,476 filed Apr. 11, 1990, which is a continuation of Ser. No. 07/344,449, filed Apr. 28, 1989, which is a continuation of Ser. No. 06/820,748, filed Jan. 22, 1986, all three now abandoned.

BACKGROUND AND SUMMARY OF THE INVENTION

This invention relates to a light scanning optical system for an image output scanner using an electro-mechanical light modulator.

An image output scanner is an apparatus which is used in facsimile or the like to scan the image of an original such as a document or the like and put out the image as image information by a light or electrical signal. Various forms of such image output scanner are known.

For example, many of the image output scanners used in popular PPC copying machines are of the type in which an original is scanned by the light of a halogen lamp or the like and the reflected light therefrom is directly imaged on an electrophotographic photosensitive member. Besides these, there is a method whereby, as in a laser beam printer, the image of an original is converted into an electrical signal, whereafter on the basis of this signal, a light modulator is used to modulate a laser beam, which in turn is imaged on a photosensitive member.

Also, in recent years, the development of the integrated circuit technique has proposed an image output scanner using an electro-mechanical light modulator having a number of deflecting elements on a base.

The general construction of the above-mentioned image output scanner will hereinafter be described with reference to the accompanying drawings.

Figure 1:
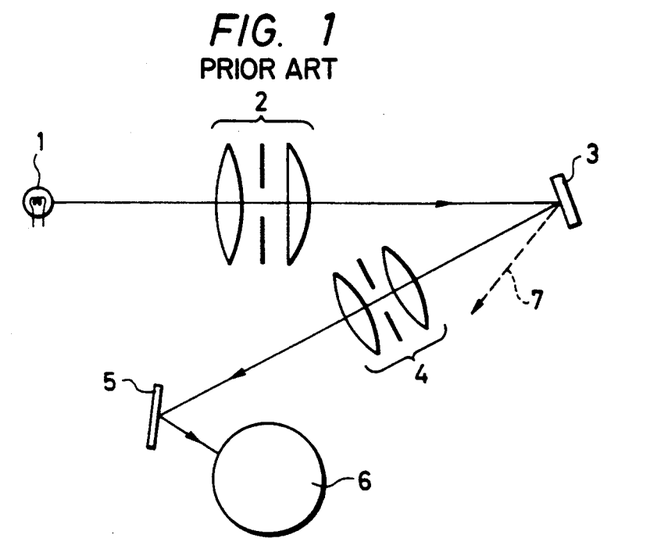
FIG. 1 schematically shows an example of the image output scanner using an electro-mechanical light modulator according to the prior art.

FIG. 1 schematically shows an example of the image output scanner using the above-described electro-mechanical light modulator (hereinafter simply referred to as the light modulator). In FIG. 1, reference numeral 1 designates a light source such as a tungsten lamp, reference numeral 2 denotes an irradiating optical system, reference numeral 3 designates the light modulator, reference numeral 4 denotes a projection optical system, reference numeral 5 designates a reflecting mirror, and reference numeral 6 denotes a photosensitive drum.

The light from the lamp 1 is applied onto the light modulator 3 by the irradiating optical system 2, and only the necessary image signal reflected light is condensed on the photosensitive drum 6 by the projection optical system 4 via the reflecting mirror 5. In such an image output scanner, various configurations of the light modulator 3 are now conceived.

Figure 2A:
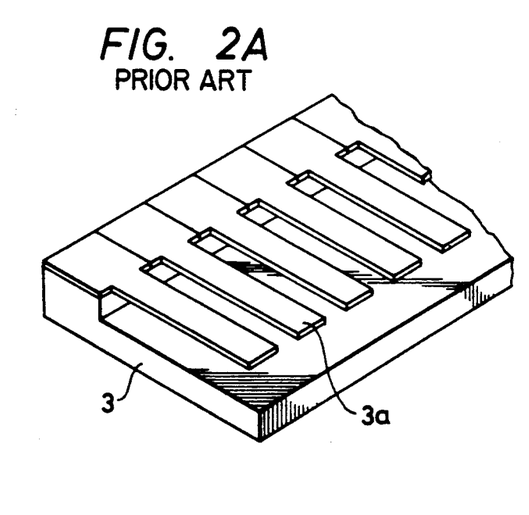
FIGS. 2A and 2B illustrate the light modulator of the prior art FIG. 1.
Figure 2B:
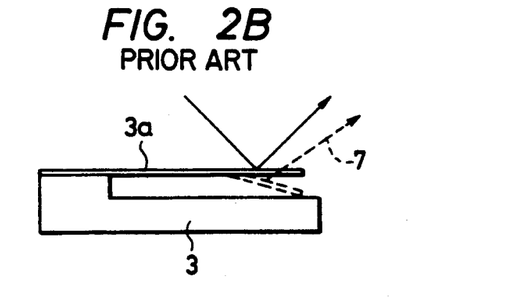

FIG. 2A is an enlarged schematic perspective view of an example of such light modulator 3, and FIG. 2B is an enlarged schematic side view thereof.

In FIG. 2, reference character 3a designate mirror picture element plates adapted to be bent upwardly or downwardly by electro-mechanical means. As shown in FIG. 2B, the direction of the reflected light 7 from the downwardly bent mirror picture element plate 3a (indicated by dotted line) differs from the direction of the reflected light (indicated by solid line) from the unbent mirror picture element plate 3a. By thus changing the direction of each of the mirror picture element plates 3a in conformity with an image signal input to the light modulator 3, it is possible to form an electrostatic latent image corresponding to the image signal on the surface of the photosensitive drum. The electrostatic latent image is converted into a visible image by the well-known electrophotographic process.

However, in the image output scanner as described above, the direction of bending of the mirror picture element plate 3a is downwardly inclined without torsion relative to the side of the mirror picture element plate 3a as shown in FIG. 2B and therefore, separation of the signal light and the unnecessary reflected light 7 becomes difficult when the diffraction in the image space is considered. As a result, the distance between the light modulator 3 and the projection optical system 4 must be made long until the two diffracted lights can be separated from each other. This is nothing but making the optical system large in the lateral direction. Also, making the distance between the light modulator 3 and the projection optical system 4 long leads to a result that the intensity of light on the photosensitive drum 6 is reduced when it is assumed that the intensity of light of the light source is constant, and to prevent it, it becomes necessary that the angle of view at which the light source subtends the lens of the irradiating optical system 2 be made great. This means that the optical system is made large in the direction of height, which in turn poses a serious problem in making the image output scanner compact.

It is an object of the present invention to provide a light scanning optical system which can efficiently separate unnecessary diffracted light and image signal light from each other.

It is a further object of the present invention to provide a compact light scanning optical system which can efficiently perform the above separation as well.

It is still a further object of the present invention to provide a light scanning optical system which is excellent in quality of printing and compact.

According to the present invention, in order to solve the above-noted problems, there is provided a light scanning optical system of an image output scanner in which a light beam incident from a light source through an irradiating optical system is applied to an electro-mechanical light modulator comprising a number of elements capable of deflecting said incident light beam in at least two directions in conformity with an input signal and arranged in the main scan direction (the direction perpendicular to the plane of the drawing sheet of FIG. 1), and image information is prepared by the change-over of the direction of deflection of each of said elements, whereafter only a signal light is projected onto a photosensitive member by a projection optical system, characterized in that the shape of at least one of said irradiating optical system and said projection optical system is flat in the main scan direction.

DESCRIPTION OF THE PREFERRED EMBODIMENTS

A specific embodiment of the present invention will hereinafter be described with reference to the drawings.

Figure 3A:
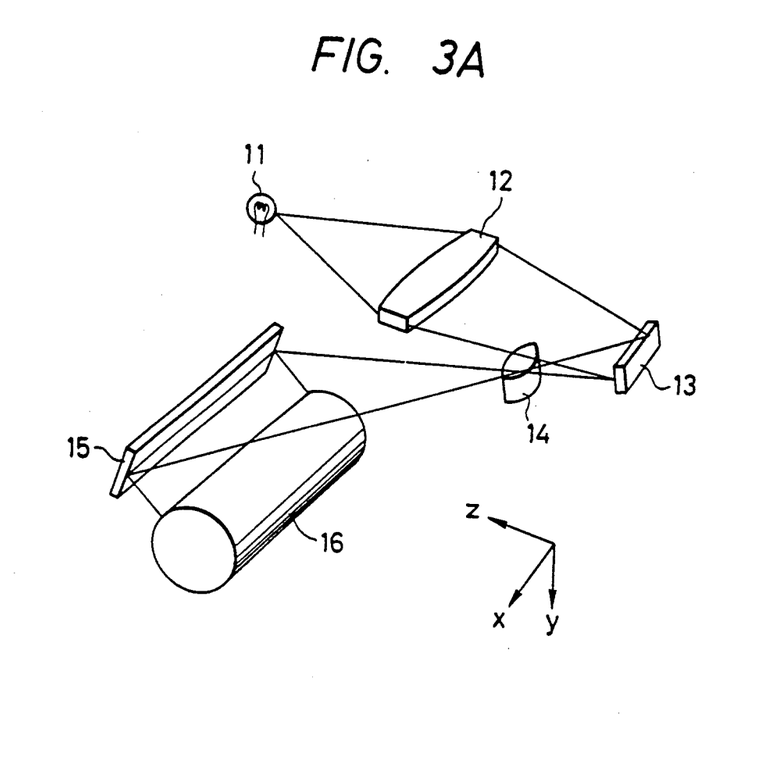
FIG. 3A is a schematic perspective view of the preferred embodiment of the optical system of the present invention.
Figure 3B:
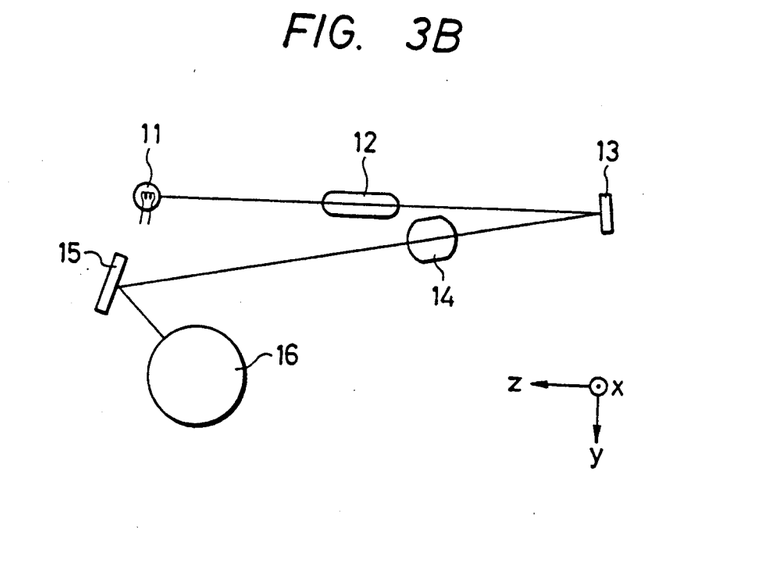
FIG. 3B is a cross-sectional view thereof.

FIG. 3A is a schematic perspective view showing an embodiment of the light scanning optical system of the present invention, and FIG. 3B is a cross-sectional view thereof.

In FIGS. 3A and 3B, reference numeral 11 designates a lamp as a light source, reference numeral 12 denotes an irradiating optical system (which may also include a reflection type optical system and is shown as a condenser lens), and reference numeral 13 designates an electro-mechanical light modulator. A light beam emitted from the lamp 11 is applied onto the electro-mechanical light modulator 13 by the condenser lens 12, is modulated by the light modulator and is thereafter reflected. The reflected light is magnification-changed by a projection optical system 14 (which may also include a reflection type optical system and is shown as a projection lens) in conformity with a desired printing width and resolution, and is condensed on a photosensitive drum 16 via a reflecting mirror 15. The lamp 11 as the light source need not be a laser of great intensity, but may be an inexpensive conventional tungsten halogen lamp of a type used in a moving picture projector or the like, because in the main scan direction, imaging is effected on the photo-sensitive drum 16 substantially at the same time and therefore a long exposure time can be secured.

Figure 4A:
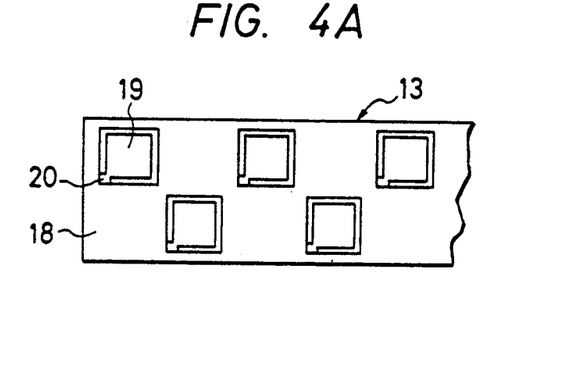
FIG. 4A is an enlarged front view of an electro-mechanical light modulator according to the present invention.

FIG. 4A is an enlarged front view of the electro-mechanical light modulator 13 (hereinafter simply referred to as the light modulator). Reference numeral 18 designates a flat base portion, and reference numeral 19 denotes mirror picture element plates which can change the inclination of their surface. In the case of FIG. 4A, a number of mirror picture element plates 19 are arranged in horizontal direction and in two rows.

The light modulator 13 is manufactured by a process similar to the manufacturing process of IC or LSI and has a construction similar to an MOS type FET transistor. The size of each side of each mirror picture element plate 19 is as minute as the order of 5-15 μm. Such picture element plates are described in detail in U.S. Pat. No. 4,842,306 assigned to the assignee of the present invention.

Figure 4B:
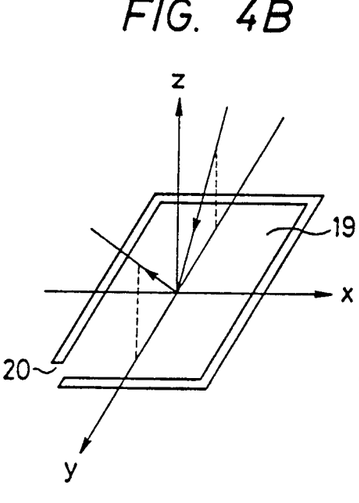
FIGS. 4B and 4C show the movement of a picture element on the light modulator of FIG. 4A.
Figure 4C:
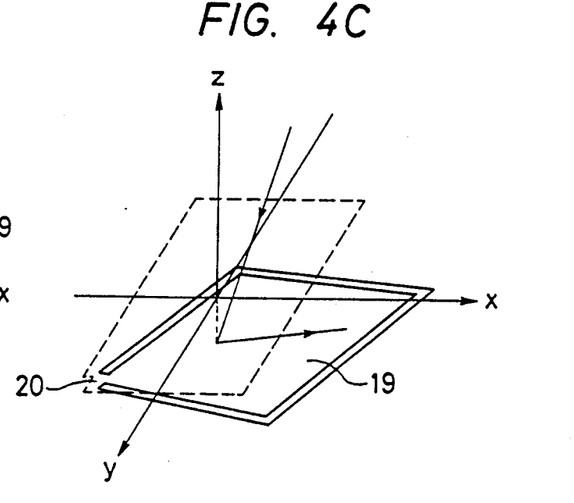
Figure 5:
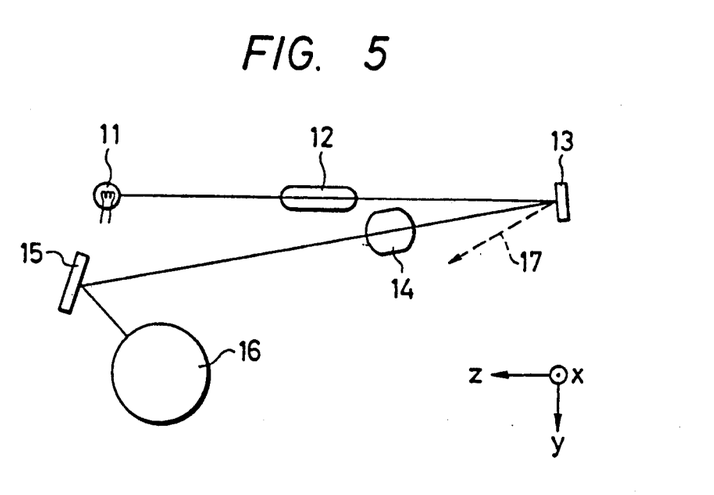
FIG. 5 shows the manner of reflection and deflection.

In conformity with an input binary modulation signal, each of said mirror picture element plates 19 keeps its parallelism to the base in the signal OFF state, as shown in FIG. 4B, and falls downwardly with its hinge portion 20 as the axis of rotation in the signal ON state, as shown in FIG. 4C. This falling-down takes place with the aid of the hinge portion 20 at a corner of the quadrilateral of the mirror picture element plate 19 and thus, unlike the bending of the surface of the mirror picture element plate 3a as shown in FIG. 2A, the surface after having fell down has an inclination in an oblique direction relative to the surface before falling down. The light having entered the light modulator 13 is reflected and deflected in conformity with this angle of fall. This state is shown in FIG. 5. The reflected light 17 indicated by dotted line in FIG. 5 is that in the signal OFF state. Of these two directions of reflection, the reflected light beam in the signal ON state is directed onto the photosensitive drum 16 by the projection lens 14, whereby there is obtained a row of dots corresponding to each picture element input modulation signal. Each dot is formed correspondingly to ON or OFF of each picture element and is therefore high in information processing function.

Figure 6:
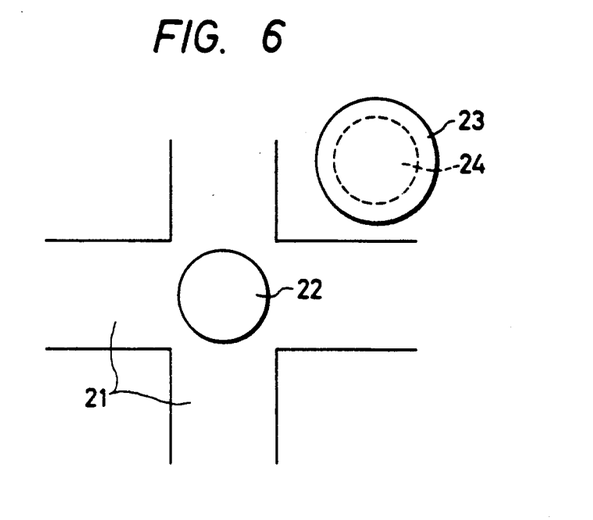
FIG. 6 shows the distribution of light on a plane containing the entrance pupil of a projection lens.

FIG. 6 schematically shows the distribution of the reflected light on a plane containing the entrance pupil of the projection lens 14 spaced apart by a finite distance from the light modulator 13 in the direction of reflection.

In FIG. 6, reference numeral 21 designates the distribution of the reflected light 17 in the signal OFF state, namely, the diffraction pattern of unnecessary light, and reference numeral 22 denotes the image of the filament of the light source 11. Reference numeral 23 designates the entrance pupil of the projection lens 14, and reference numeral 24 denotes the distribution of the reflected light in the signal ON state, namely, the necessary light modulation signal.

Figure 7A:
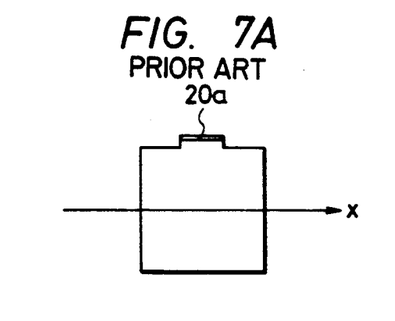
FIGS. 7A, 7B, 7C and 7D illustrate cases where the position at which a hinge portion is attached to a mirror picture element plate is changed.
Figure 7B:
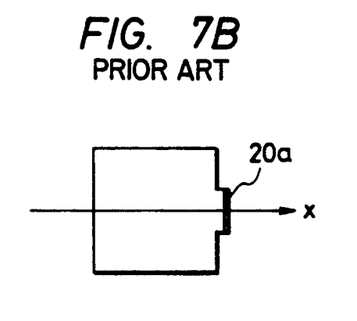
Figure 7C:
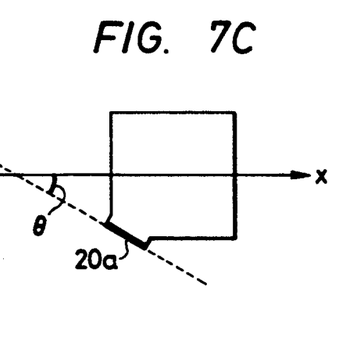
Figure 7D:
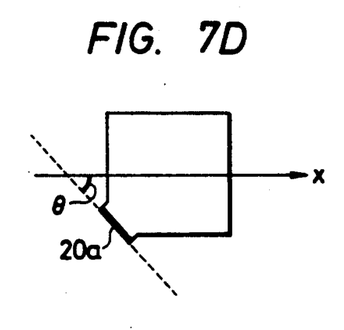

The size of said mirror picture element plates 19 is a size which cannot neglect the diffraction of the incident light beam from the limitation or the like of their arrangement and the shape of each picture element is a quadrilateral and therefore, this diffraction pattern widens in the form of a cross in the direction of each side of the quadrilateral, as shown in FIG. 6. As previously described, each mirror picture element plate 19 is brought down in the oblique direction with the hinge 20 provided at a corner of the quadrilateral of the picture element plate 19 as the axis of rotation, whereby it becomes possible to set the signal light so as not to overlap the cross of the diffraction pattern 21 of unnecessary light. Bringing down the mirror picture element plate in the oblique direction will now be described in detail. FIG. 7 shows cases where the hinge portion 20 is attached to various portions of the mirror picture element plate 19. In FIGS. 7A-7D, reference character 20a designates the axis of rotation of the hinge 20, and the x-axis is the coordinates axis plotted in the same direction as the main scan direction. If the axis of rotation is provided as shown in FIGS. 7A and 7B (the cases of examples of the prior art), it is difficult to separate the diffraction pattern of the signal light from the cross of the diffraction pattern of the unnecessary light, but if the axis of rotation is provided as shown in FIGS. 7C and 7D, it becomes easy to separate the former from the latter as previously described. That is, if the angle $\theta$ formed between the axis of rotation and the x-axis is neither 0 nor $\pi/2$, the aforementioned effect occurs more or less and particularly, when the angle $\theta$ is $\pi/4$, the greatest effect can be expected to occur. Consequently, if the axis of rotation 20a is set so that $\theta = \pi/4$, the separation of the two reflected lights will become best and the diffracted light 21 as the noise entering the entrance pupil 23 can be very much reduced.

Reducing this diffracted light as the noise entering the entrance pupil 23 is a contrivance which always becomes necessary from the limitation that a great angle of deflection of the mirror picture element plates 19 of the light modulator 13 cannot be secured.

As another important factor, to reduce the diffracted light as the noise entering the entrance pupil, the expanse of the diffracted light pattern 21 may be made small, but the expanse of this diffracted light pattern 21 is in a deep relation with the shape of the condenser lens 12.

The shape of the illuminating condenser lens 12 may be very flat because, as shown in FIG. 4A, a number of picture element plates 19 of the light modulator 13 are arranged in horizontal direction and in two rows in vertical direction and therefore it will suffice to apply a laterally long slit light beam. If, on the contrary, the condenser lens 12 is made not flat but thick, the light beam entering the light modulator 13 will include much of the light beam in a direction perpendicular to the main scan direction and the expanse and intensity of the diffraction pattern will be made great and thus, even if the angle $\theta$ is optimally selected as described above, it will become difficult to take out only the necessary light modulation signal. Consequently, it is preferable to make the condenser lens flat.

Also, making the condenser lens 12 flat provides a great advantage in that the optical system is contained compactly in the direction of height.

By the condenser lens 12 and the projection lens 14 used in the present invention being made flat as shown in FIGS. 3A and 3B, the optical system can be made compact in the direction of height. Particularly, making the projection lens 14 flat makes the aperture ratio different relative to the light modulator 13 as the secondary light source of the projection lens 14, in the main scan direction and the sub scan direction, and the shape of each dot imaged on the photosensitive drum 16 through the projection lens 14 is longer in the sub scan direction than in the main scan direction, and this is preferable in quality of printing or image depiction.

Further, disposing the projection lens 14 as a flat shape parallel to the lateral direction of the light modulator array element leads to the possibility of separating and eliminating the noise-providing unnecessary diffracted light component while keeping the distance between the projection lens and the light modulator array element short even when the difference in the angle of reflection and deflection of the light modulator array between the ON state and the OFF state can assume only a small angle, and this in turn leads to an advantage that the optical system can be made compact in the lateral direction thereof.

The present invention is not limited to the above-described embodiment, but various modifications thereof are possible.

For example, the shape of the mirror picture element plates on the light modulator is not limited to a quadrilateral, but may be a lozenge, a triangle or an ellipse to obtain the same effect.

I claim:

1. A light scanning optical system of an image output scanner, comprising:
    a light source;
    a lens means, the shape of said lens means being flat in a main scan direction so as to condense a light from said light source to a slit-like beam, a section of which extends in the main scan direction;
    an electro-mechanical light modulator, said modulator including an array of elements arranged in the main scan direction and each capable of deflecting an incident light beam from said light source in at least two directions in accordance with an input signal, said slit-like light beam impinging on said array of elements and each of said elements making image information by a change-over of a direction of deflection of each of said elements in accordance with the input signal; and
    a projection optical system for projecting only a signal light of the image information which is deflected in at least one direction of said at least two directions.

2. A light scanning optical system according to claim 1, wherein each of said elements of said modulator rotates about an axis of rotation to thereby deflect the incident light beam.

3. A light scanning optical system according to claim 2, wherein the angle formed between said axis of rotation of each of said elements and the main scan direction of said array of elements is an angle other than 0 and $\pi/2$.

4. A recording apparatus comprising:
    a light source;
    a lens means, the shape of said lens means being flat in a main scan direction so as to condense a light from said light source to a slit-like beam, a section of which extends in the main scan direction;
    an electro-mechanical light modulator, said modulator including an array of elements arranged in the main scan direction and each capable of deflecting an incident light beam from said light source in at least two directions in accordance with an input signal, said slit-like beam impinging on said array of elements and each of said elements making image information by a change-over of a direction of deflection of each of said elements in accordance with the input signal;
    a projection optical system for projecting only a signal light of the image information which is deflected in at least one direction of said at least two directions; and
    a recording medium onto which the signal light from the projection optical system is projected.

5. Apparatus according to claim 4, wherein each of said elements of said modulator rotates about an axis of rotation to thereby deflect the incident light beam.

6. Apparatus according to claim 5, wherein the angle formed between said axis of rotation of each of said elements and the main scan direction of said array of elements is an angle other than 0 and $\pi/2$.

7. A light scanning optical system of an image output scanner, comprising:
    a light source;
    an electro-mechanical light modulator, said modulator including an array of elements arranged in a main scan direction and each capable of deflecting an incident light beam from said light source in at least two directions in accordance with an input signal, each of said elements making image information by a change-over of a direction of deflection of each of said elements in accordance with the input signal; and
    a projection lens system for projecting only a signal light of the image information which is deflected in at least one direction of said at least two directions, the shape of said projection lens system being flat in the main scan direction and said projection lens system being positioned in an area out of which light other than said signal light mostly falls, the flat shape of said projection lens system causing an aperture ratio of said projection lens system to be relatively different between the main scan direction and a sub-scan direction so that the shape of each dot imaged on a projection plane in the sub-scan direction through the projection lens system is longer than that in the main scan direction.

8. A system according to claim 7, wherein each of said elements of said modulator rotates about an axis of rotation to thereby deflect the incident light beam.

9. A system according to claim 8, wherein the angle formed between said axis of rotation of each of said elements and the main scan direction of said array of elements is an angle other than 0 and $\pi/2$.

10. A recording apparatus comprising:
a light source;
an electro-mechanical light modulator, said modulator including an array of elements arranged in a main scan direction and each capable of deflecting an incident light beam from said light source in at least two directions in accordance with an input signal, each of said elements making image information by a change-over of a direction of deflection of each of said elements in accordance with the input signal;
a projection lens system for projecting only a signal light of the image information which is deflected in at least one direction of said at least two directions, the shape of said projection lens system being flat in the main scan direction and said projection lens system being positioned in an area out of which light other than said signal light mostly falls, the flat shape of said projection lens system causing an aperture ratio of said projection lens system to be relatively different between the main scan direction and a sub-scan direction so that the shape of each dot imaged on a projection plane in the sub-scan direction through the projection lens system is longer than that in the main scan direction;
an irradiating means for receiving light from said light source; and
a recording medium onto which the signal light from the projection lens system is projected.

11. Apparatus according to claim 10, wherein each of said elements of said modulator rotates about an axis of rotation to thereby deflect the incident light beam.

12. Apparatus according to claim 11, wherein the angle formed between said axis of rotation of each of said elements and the main scan direction of said array of elements is an angle other than 0 and $\pi/2$.

13. An optical system for use in an image forming apparatus comprising:
a light source;
a lens means, the shape of said lens means being flat in a main scan direction so as to condense a light from said light source to a slit-like beam, a section of which extends in the main scan direction;
an electro-mechanical light modulator, said modulator including an array of elements arranged in a main scan direction and each capable of deflecting an incident light beam from said light source in at least two directions in accordance with an input signal, each of said elements making image information by a change-over of a direction of deflection of each of said elements in accordance with the input signal; and
a projection lens system for projecting only a signal light of the image information which is deflected in at least one direction of said at least two directions, the shape of said projection lens system being flat in the main scan direction and said projection lens system being positioned in an area out of which light other than said signal light mostly falls, the flat shape of said projection lens system causing an aperture ratio of said projection lens system to be relatively different between the main scan direction and a sub-scan direction so that the shape of each dot imaged on a projection plane in the sub-scan direction through the projection lens system is longer than that in the main scan direction.

14. A system according to claim 13, wherein each of said elements of said modulator rotates about an axis of rotation to thereby deflect the incident light beam.

15. A system according to claim 14, wherein the angle formed between said axis of rotation of each of said elements and the main scan direction of said array of elements is an angle other than 0 and $\pi/2$.

16. A recording apparatus, comprising:
a light source;
a lens means, the shape of said lens means being flat in a main scan direction so as to condense a light from said light source to a slit-like beam, a section of which extends in the main scan direction;
an electro-mechanical light modulator, said modulator including an array of elements arranged in the main scan direction and each capable of deflecting an incident light beam from said light source in at least two directions in accordance with an input signal, each of said elements making image information by a change-over of a direction of deflection of each of said elements in accordance with the input signal;
a projection lens system for projecting only a signal light of the image information which is deflected in at least one direction of said at least two directions, the shape of said projection lens system being flat in the main scan direction and said projection lens system being positioned in an area out of which light other than said signal light mostly falls, the flat shape of said projection lens system causing an aperture ratio of said projection lens system to be relatively different between the main scan direction and a sub-scan direction so that the shape of each dot imaged on a projection plane in the sub-scan direction through the projection lens system is longer than that in the main scan direction; and
a recording medium onto which the signal from the projection lens system is projected.

17. Apparatus according to claim 16, wherein each of said elements of said modulator rotates about an axis of rotation to thereby deflect the incident light beam.

18. Apparatus according to claim 17, wherein the angle formed between said axis of rotation of each of said elements and the main scan direction of said array of elements is an angle other than 0 and $\pi/2$.

* * * * *

UNITED STATES PATENT AND TRADEMARK OFFICE
CERTIFICATE OF CORRECTION

PATENT NO. : 5,150,250
DATED : September 22, 1992
INVENTOR(S) : MICHITAKA SETANI It is certified that error appears in the above-identified patent and that said Letters Patent is hereby corrected as shown below:

On the title page, Item

[30] FOREIGN APPLICATION PRIORITY DATA
"61-009155 should read --60-009155--.
"61-009156 should read --60-009156--.

[56] REFERENCES CITED
U.S. PATENT DOCUMENTS
"4,447,112 5/1989" should read --4,447,112 5/1984--.

[57] ABSTRACT

Line 11, "is" should read --which is--.

COLUMN 1

Line 62, "designate" should read --designates--.

UNITED STATES PATENT AND TRADEMARK OFFICE
CERTIFICATE OF CORRECTION

PATENT NO. : 5,150,250
DATED : September 22, 1992
INVENTOR(S) : MICHITAKA SETANI It is certified that error appears in the above-identified patent and that said Letters Patent is hereby corrected as shown below:

COLUMN 3

Line 12, "EMBODIMENTS" should read --EMBODIMENT--.
Line 39, "photo-sensitive" should read --photosensitive--.
Line 56, "4,842,306" should read --4,842,396--.
Line 68, "fell" should read --fallen--.

COLUMN 4

Line 47, "coordinates" should read --coordinate--.

Signed and Sealed this

Eighteenth Day of January, 1994

BRUCE LEHMAN

Attest:

Attesting Officer

Commissioner of Patents and Trademarks